(12) United States Patent
Mohammed et al.

(10) Patent No.: US 9,735,601 B2
(45) Date of Patent: Aug. 15, 2017

(54) SYSTEMS AND TECHNIQUES FOR ENERGY STORAGE REGULATION

(71) Applicants: Osama Mohammed, Miami, FL (US); Ahmed Elsayed, Miami, FL (US); Christopher Lashway, Miami, FL (US); Tarek A. Youssef, Miami, FL (US)

(72) Inventors: Osama Mohammed, Miami, FL (US); Ahmed Elsayed, Miami, FL (US); Christopher Lashway, Miami, FL (US); Tarek A. Youssef, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 110 days.

(21) Appl. No.: 14/848,711

(22) Filed: Sep. 9, 2015

(65) Prior Publication Data
US 2017/0070073 A1    Mar. 9, 2017

(51) Int. Cl.
*H02J 7/00* (2006.01)
*H01M 10/42* (2006.01)
*H02J 7/34* (2006.01)

(52) U.S. Cl.
CPC ......... *H02J 7/0068* (2013.01); *H01M 10/425* (2013.01); *H02J 7/0081* (2013.01);
(Continued)

(58) Field of Classification Search
CPC ...... H02J 7/0019; H02J 7/0014; H02J 7/0018; H02J 7/0021; H02J 7/0031; H02J 7/0068; H02J 7/0081; H02J 7/0093; H02J 7/345; G01R 31/3606; G01R 31/3658; G01R 19/16542; G01R 31/362; H01M 10/441; H01M 10/052; H01M 10/46; H01M 10/48; H01M 2010/4271; H01M 2220/20; H01M 2/206; H01M 10/425
See application file for complete search history.

(56) References Cited

U.S. PATENT DOCUMENTS 4,616,170 A * 10/1986 Urstoger ............... H01M 10/44
320/119
8,803,363 B2   8/2014 Veltri
(Continued)

*Primary Examiner* — Nha Nguyen
(74) *Attorney, Agent, or Firm* — Saliwanchik, Lloyd & Eisenschenk

(57) ABSTRACT

Systems and techniques are disclosed for individually controlling energy storage devices in an array of devices. An energy storage regulation unit (ESRU) is described that enables the connection of an energy storage device to a system load bus and a charging/diagnostic bus such that the energy storage device may be individually charged and/or disconnected for maintenance. The ESRU comprises switches for selectively connecting the system load bus circuit, charging circuit, or a bypass circuit. An energy storage regulator is further described for enabling the control of one or more ESRUs. A regulator controller may receive sensor or measurement data from the ESRUs connected to the energy storage regulator, and may also issue control instructions that control the switches of the individual ESRUs. Measurement data can include, for example, voltage, current, or temperature information relating to a specific ESRU.

19 Claims, 7 Drawing Sheets

(52) U.S. Cl.
CPC ... *H02J 7/0093* (2013.01); *H01M 2010/4271* (2013.01); *H02J 7/345* (2013.01)

(56) References Cited

U.S. PATENT DOCUMENTS

| | | | |
|---|---|---|---|
| 2011/0234169 A1* | 9/2011 | Yoshikawa | H02J 7/0031 320/134 |
| 2013/0113287 A1 | 5/2013 | Singh et al. | |
| 2013/0116889 A1 | 5/2013 | Zhang et al. | |
| 2014/0015537 A1* | 1/2014 | Uchida | G01R 31/3606 324/434 |
| 2015/0028817 A1* | 1/2015 | Brockerhoff | H02J 7/0019 320/137 |
| 2015/0048794 A1* | 2/2015 | Park | H02J 7/0016 320/118 |

\* cited by examiner

SYSTEMS AND TECHNIQUES FOR ENERGY STORAGE REGULATION

BACKGROUND

Over the last two decades, energy systems have undergone significant changes, including the wide-scale deployment of different types of energy storage devices. With an increasing diversity of energy storage devices comes increasing complexity in their configuration and management. Common management systems are particularly deficient in their capability to manage series-configured energy storage devices. In a series-connected configuration, the extraction of one energy storage element can result in a total loss of power from all the devices in the series.

BRIEF SUMMARY

Systems and techniques for individually controlling energy storage devices in an array of devices are disclosed. An energy storage regulation unit (ESRU) is described that enables the connection of an energy storage device to a system load bus and a charging/diagnostic bus such that the energy storage device may be individually charged and/or disconnected for maintenance. The ESRU comprises a number of switches for selectively connecting the system load bus circuit, charging circuit, or a bypass circuit.

In certain embodiments, an energy storage regulator is described for enabling the control of one or more ESRUs. A regulator controller may receive sensor or measurement data from the ESRUs under the control of the energy storage regulator, and may also issue control instructions that control the switches of the individual ESRUs. Measurement data can include, for example, voltage, current, or temperature information relating to a specific ESRU.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and techniques for individually controlling energy storage devices in an array of devices are disclosed. An energy storage regulation unit (ESRU) is described that enables the connection of an energy storage device to a system load bus and a charging/diagnostic bus such that the energy storage device may be individually charged and/or disconnected for maintenance. The ESRU comprises a number of switches for selectively connecting the system load bus circuit, charging circuit, or a bypass circuit.

In certain embodiments, an energy storage regulator is described for enabling the control of one or more ESRUs. A regulator controller may receive sensor or measurement data from the ESRUs under the control of the energy storage regulator, and may also issue control instructions that control the switches of the individual ESRUs. Measurement data can include, for example, voltage, current, or temperature information relating to a specific ESRU.

An energy system typically includes energy loads, energy sources, and, with increasing frequency, and energy storage devices. Energy loads include energy consuming devices such as appliances, heating/cooling systems, manufacturing equipment in a factory, computing equipment (e.g., in data centers), lighting, systems controls, etc. In general, a load is a device that consumes energy as part of its functioning. Energy sources can include utility power, renewable sources such as photovoltaic cells (e.g., solar panels), wind-power, biomass generation, and local generation capacity such as a natural gas generator. Energy storage devices or systems often include electrochemical storage (e.g., batteries), but can also include, e.g., compressed air energy storage, hydrogen storage, thermal energy storage, electromechanical inertia-based devices like flywheels, capacitors, and pumped-storage hydroelectricity in certain larger scale energy customer applications.

An energy storage device using electrochemical storage includes battery chemistries such as lithium-ion, lithium-ion polymer, nickel-cadmium, nickel-metal hydride, lead-acid, and lead-acid hybrids. Other electrochemical storage types can include flow batteries, super-capacitors, and ultra-capacitors, which can have lower energy densities and higher power densities than typical batteries.

None of the aforementioned examples are intended to be limiting as to the types of devices that may be present in an energy system.

Figure 1:
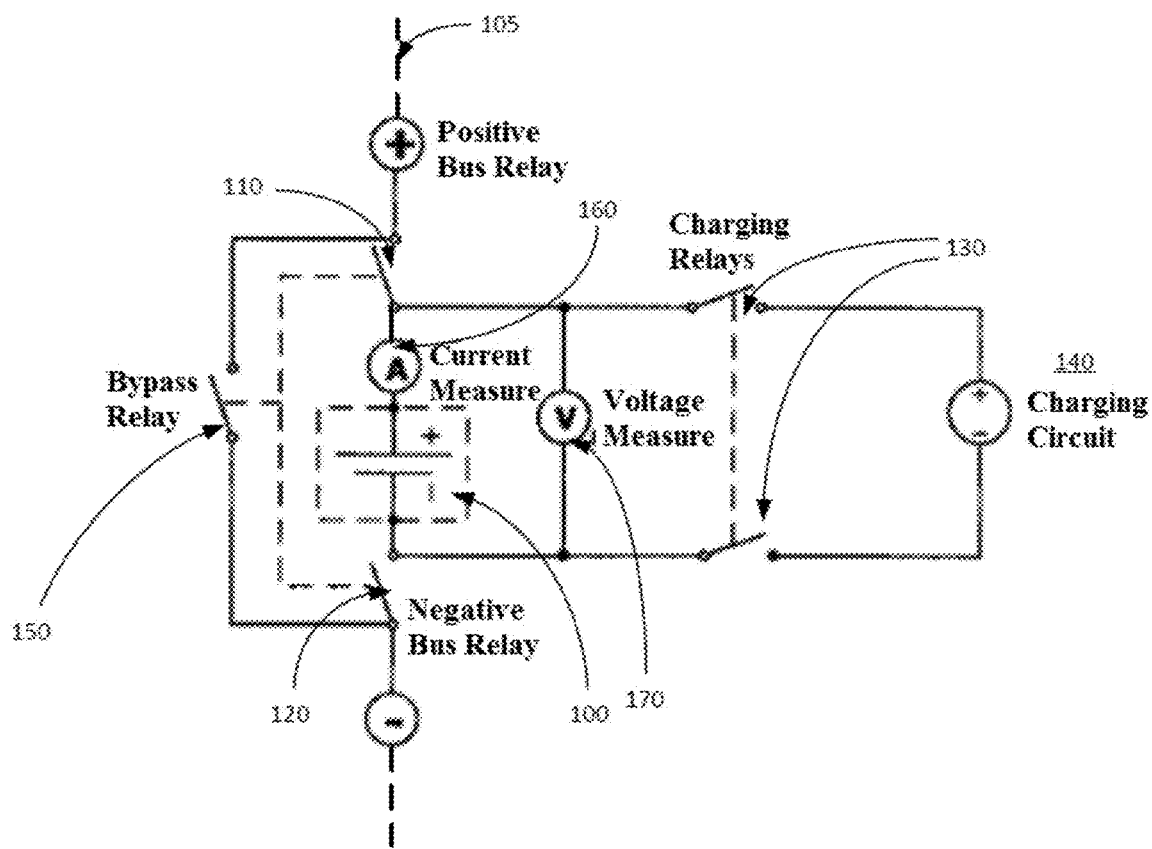
FIG. 1 shows an example schematic of an energy storage regulation unit.

FIG. 1 shows an example schematic of an energy storage regulation unit (ESRU). As shown with respect to FIG. 2, one or more ESRU can be arrayed together under the control of a regulator controller. The totality of the ESRUs and the regulator controller form an energy storage regulator system or apparatus.

Returning to FIG. 1, an energy storage device 100 is depicted at the relevant placement in the ESRU schematic of connections. The energy storage device shown in the schematic is a battery; however, other types of energy storage devices may be used. The energy storage device 100 is emplaced on the energy system load bus 105, to which the energy storage device is connected via a positive bus switch 110 and a negative bus switch 120. This pair of bus switches (110, 120) creates electrical continuity across the system load bus 105 when the switches are closed (e.g., enabled/ON). When the pair of bus switches (110, 120) are both closed, the energy storage device 100 is connected to the energy system load bus 105 so that loads emplaced elsewhere on the bus can draw energy from the energy storage device 100. When the pair of bus switches (110, 120) are both open, the energy storage device 100 is disconnected from the system load bus 105 and other functions may be performed (e.g., charging, maintenance).

The ESRU includes a pair of charging switches 130 that are emplaced so as to selectively connect the energy storage device to a charging bus/circuit 140. This pair of charging switches 130 creates electrical continuity between the charging bus 140 and the energy storage device 100 when the charging switches are both closed. When the pair of charging switches 130 is closed, the energy storage device 100 can be charged by virtue of its connection to a power source connected to the charging bus. When the pair of charging switches 130 are both open, the energy storage device 100 is disconnected from the charging bus 140 and other functions may be performed (e.g., maintenance, normal operation of the storage device as an energy provider to the load bus 105).

The ESRU includes a bypass switch 150 that is emplaced so as to selectively maintain the continuity of the system load bus 105 through a bypass circuit while bypassing the connection through the energy storage device 100. When the bypass switch 150 is closed, the system load bus 105 maintains connectivity, bypassing the energy storage device 100, even while the positive and negative bus switches (110, 120) remain open. When the bypass switch 150 is closed, the energy storage device 100 can be charged or maintained without, for example, impacting the connectivity of a series-connected system load bus 105.

As used herein, a "switch" can be any component familiar to practitioners in the art that can selectively break an electrical circuit by interrupting the current or diverting the current from one conductor to another. A switch may be operated, for example, by a moving object, or in response to a control signal or input from a sensing element (e.g., for sensing temperature, pressure, or flow). A switch may include a relay, which is controlled by an electrical signal. A relay can include a solid-state relay. A switch can also include a transistor such as a metal-oxide-semiconductor field-effect transistor (MOSFET) or insulated-gate field-effect transistor (IGFET). In some cases, a single physical switch may selectively control connectivity across more than one circuit. As described herein, when a switch is "open" (or disabled, OFF), the switch has interrupted the current across the electrical circuit. When the switch is "closed" (or enabled, ON), the switch has connected the electrical circuit.

In some embodiments, a device for measuring current 160 drawn from an energy storage device may be provided as part of the ESRU. In some embodiments, a device for measuring voltage 170 across the energy storage device may be provided as part of the ESRU. Devices for measuring current or voltage can be, for example, devices using Hall Effect sensors or circuits based on isolated linear amplifiers.

In some embodiments, an interlock device may be present that prevents a particular plurality of the switches from closing at the same time.

Figure 2:
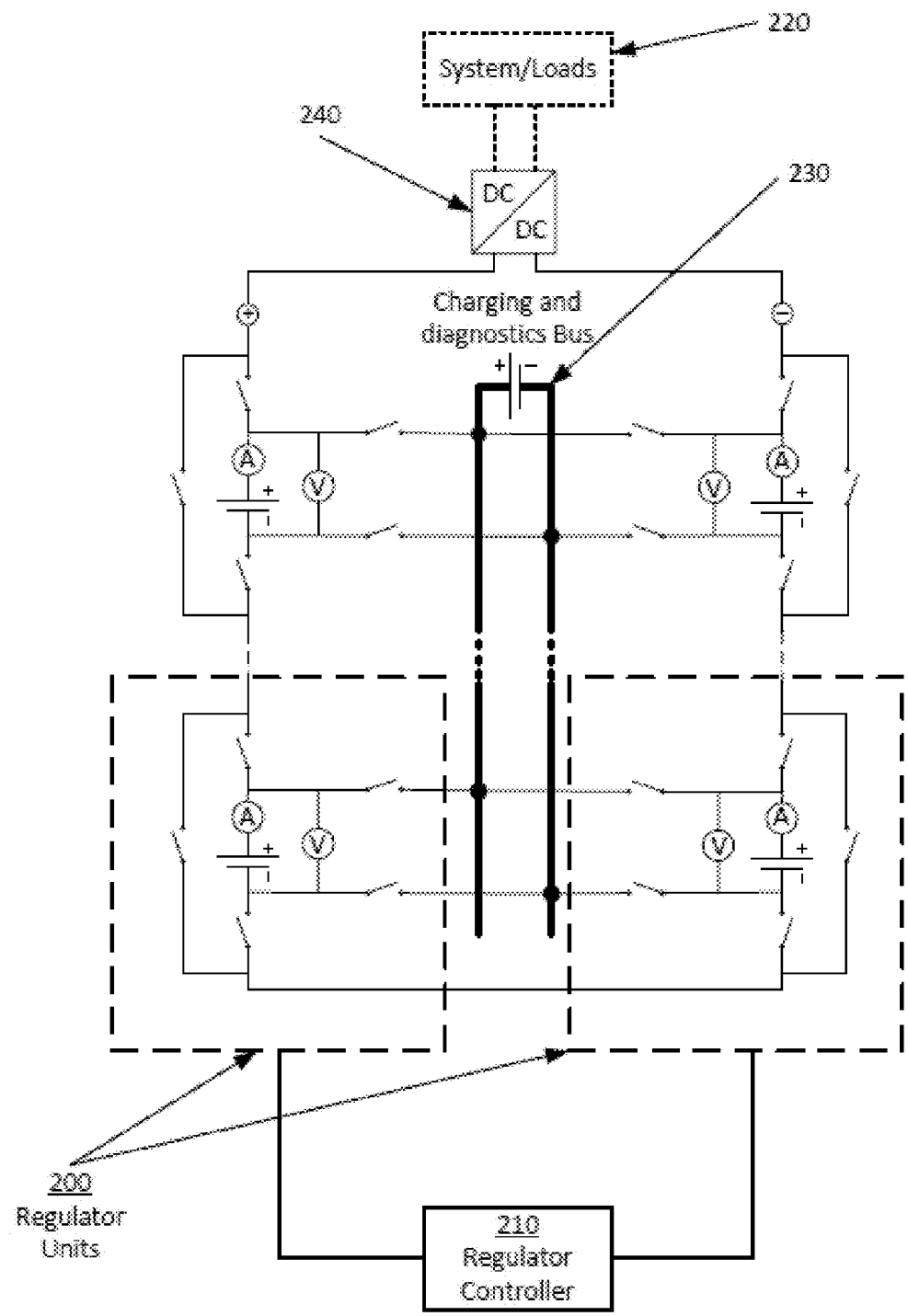
FIG. 2 shows an example schematic of an energy storage regulator including multiple energy storage regulation units and a regulator controller.

FIG. 2 shows an example schematic of an energy storage regulator including multiple energy storage regulation units and a regulator controller.

The schematic of FIG. 2 shows an n-unit group of energy storage regulation units. An energy storage regulation unit, two of which are outlined in the figure by dashed line 200, is an instance of the unit described with respect to FIG. 1. The ESRUs have been placed such that they are connected in parallel to a common charging and diagnostics bus 230 that provides energy for recharging the energy storage devices in the ESRUs when connected to the charging bus 230 via closed charging switches.

Controlling the switch states of the ESRUs, and monitoring various properties of its energy storage device and other relevant environmental factors, are performed by a regulator controller 210. A group controlled by a given regulator controller 210 may include one or more ESRUs. In one general aspect, a regulator controller 210 receives inputs from measurement devices (e.g., on the energy storage regulator or on the units themselves), determines the operating modality of one or more of the ESRUs based on the input from the measurement devices, and sends control instructions to the switches on the individual ESRUs in accordance with the operating modality. The processes of the regulator controller 210 are described in more detail with respect to FIGS. 3A-3C. While, for clarity, only two ESRUs are shown as connected to the regulator controller 210 in FIG. 2, in preferred embodiments all the ESRUs in a given configuration may be connected to one or more regulator controllers.

Measurement devices can include devices for measuring voltage or current, for example those using Hall Effect sensors or circuits based on isolated amplifiers. The state of charge (SoC) may be calculated by the regulator controller 210 with respect to measurements received from these measurement devices. The SoC may be used by the regulator controller 210 to determine the operating modality of one or more energy regulation units 200 under its control.

Since the energy storage regulator is capable of supporting different types of energy storage devices, each type may have its own particular set of optimal operating parameters. For instance, most types of electrochemical sources are impacted by temperature fluctuations in the ambient environment. With lithium-ion based energy storage devices, for example, temperature regulation is important when attempting to charge the device at voltages near the maximum level. Thus, some implementations may include additional measurement devices, for example a temperature sensor, associated with one or more ESRUs being controlled or with the energy storage regulator itself. The temperature sensing device may be, e.g., a thermocouple. Information about the temperature of the energy storage device, the ESRU, the energy storage regulator, or of the ambient environment may be used by the regulator controller 210 to determine the operating modality of one or more ESRUs 210.

The energy storage regulator (including unit(s), controller, and charging/diagnostics bus) are connected to the overall energy system 220 to which it supplies energy. The connection to the energy system 220 and the overall connectivity of the energy storage devices may generally be maintained by the system load bus. The system load bus may have one or more additional connectivity components. For example, in an energy storage regulator containing batteries, the terminals of the battery bank may, for example, be connected to a traditional DC-DC boost converter 240, which helps to stabilize the DC bus voltage at the required level. A converter 240 may be used because the operating modalities of the ESRU may involve the extraction of some storage devices from the series array, which changes the array's voltage. Thus, a simple boost DC/DC converter 240 can be introduced to regulate the array terminal voltage so that it is adequate for the load connection. Such a DC/DC converter 240 has, for example, two sides—primary and secondary—and it regulates its secondary voltage at a pre-specified value, while the primary voltage can vary widely. In some instances, the boost converter may be connected to the overall energy system. Further, the converter may be unidirectional, since the charging of the energy storage devices is accomplished via another bus.

Figure 3A:
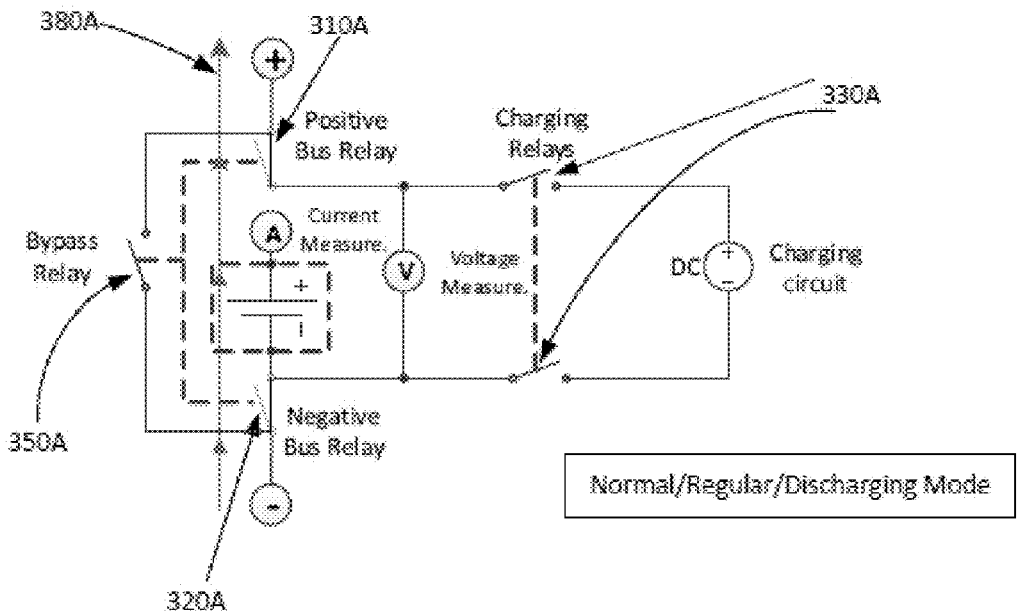
FIGS. 3A-3C show energy storage regulation units in various operating modalities.
Figure 3B:
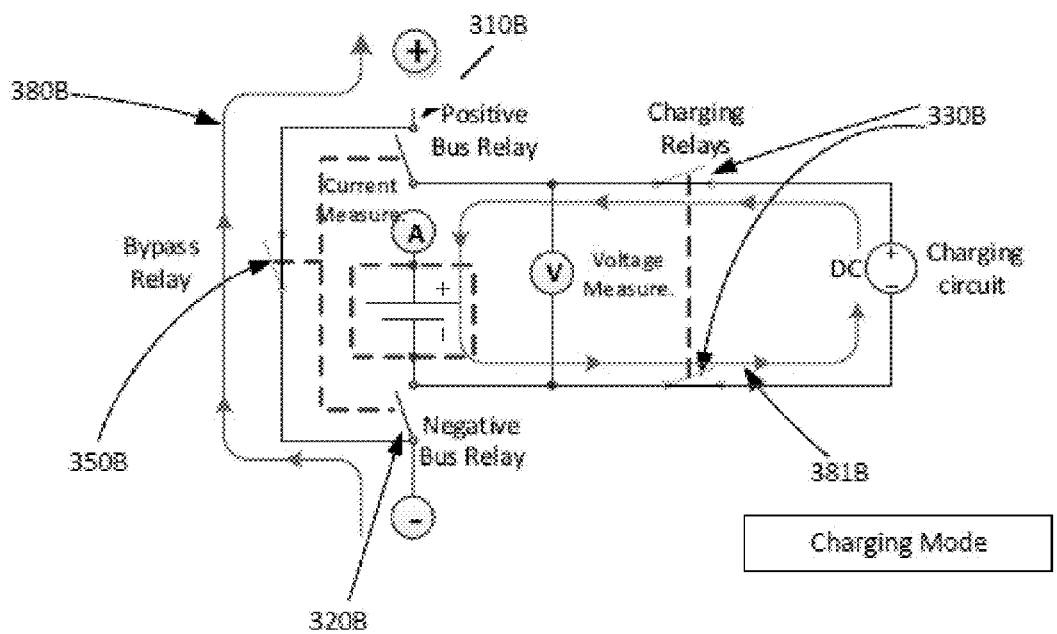
Figure 3C:
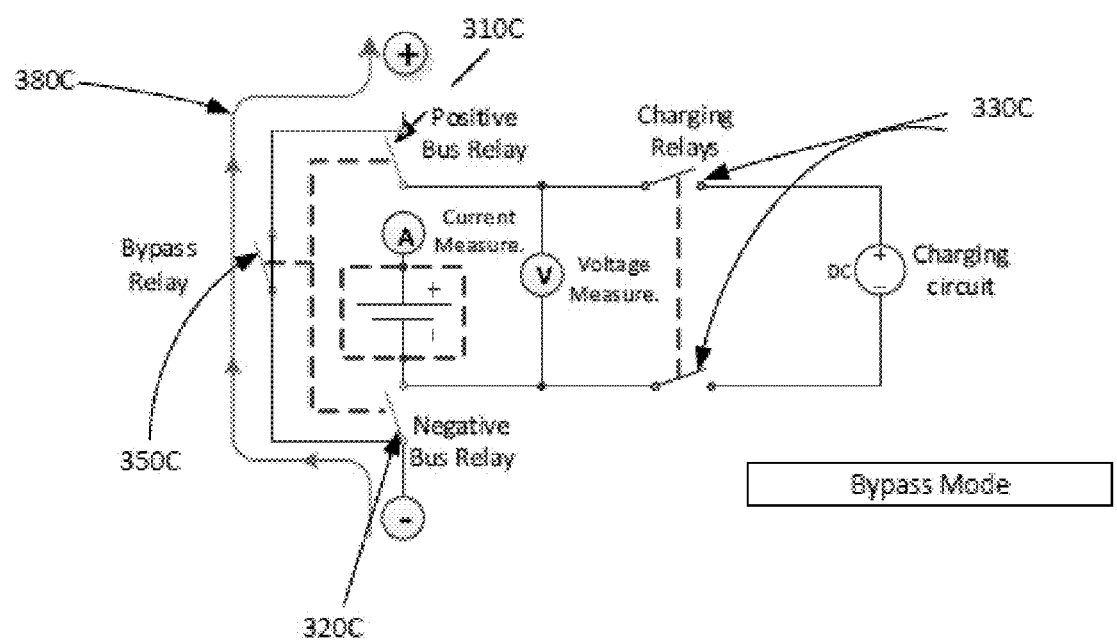

FIGS. 3A-3C show energy storage regulation units in various operating modalities in response to control instructions from a regulator controller.

As noted, a regulator controller is operable to receive measurement data from one or more measurement devices.

The measurement devices can be connected to measure relevant operating information such as the current and/or voltage of an energy storage device, or the current temperature at or very near to the energy storage device. The measurement data is used to determine an operating modality for one or more of the ESRUs under its control and issue a control instruction to enable the operating modality on a particular ERSU. An operating modality is one of the following: a normal modality, a charging modality, and a bypass modality.

FIG. 3A shows the state of an energy storage regulation unit in a normal modality. The positive load bus switch 310A and the negative load bus switch 320A are closed so that the system load bus is connected to the energy storage device as a power source. The bypass switch 350A is open so that the energy flows to the system load bus through the energy storage device and energy is provided to demand devices from the energy storage device. The path of the power flow through the energy storage device is indicated by the line 380A. The charging switches 330A are open so that the energy storage device is not simultaneously being charged while it is providing energy. The load bus switches may be, for example, normally-closed relays. The bypass switch and the charging switches may be, for example, normally-open relays.

FIG. 3B shows the state of an energy storage regulation unit in a charging modality. In a charging modality, the positive load bus switch 310B and the negative load bus switch 320B may be changed to open. The bypass switch 350B may be closed in order to offer an alternative path for current flow to and from the remainder of the devices on the system load bus. The path of the power flow through the bypass circuit is indicated by the line 380B. The charging bus switches 330B are closed so that power flows from the power source via the charging bus to the energy storage device. The path of the power flow through the charging bus to the energy storage device is indicated by the line 381B. This technical feature enables the ability for an individual energy storage device to be charged without interrupting the continuity of the remainder of a group of serially-connected storage devices.

FIG. 3C shows the state of an energy storage regulation unit in a bypass modality. In a bypass modality, the bypass switch 350C is closed in order to offer an alternative path for current flow to and from the remainder of the devices on the system load bus. The path of the power flow through the bypass circuit is indicated by the line 380C. The charging switches 330C and the positive load bus switch 310C and negative load bus switch 320C remain open, disconnecting the energy storage device from the system load bus and the charging bus. This technical feature enables the ability for an individual energy storage device to undergo maintenance such as removal, replacement, or diagnostics that benefit from the storage device being isolated from the rest of the energy system.

Figure 4:
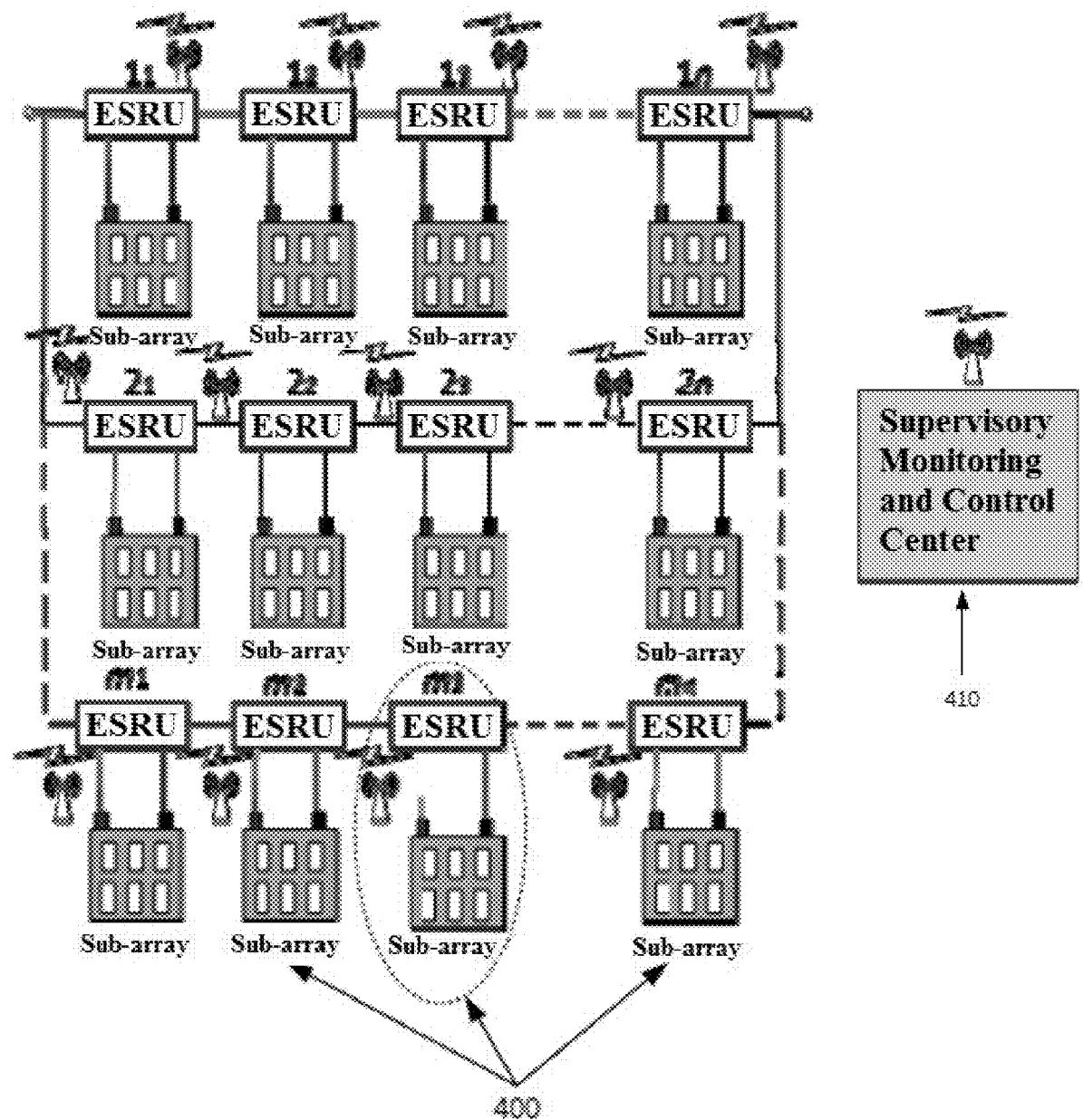
FIG. 4 shows a block diagram of an example environment in which multiple energy storage regulators are present.

In some instances, multiple energy storage regulators, each controlling a group of one or more energy storage devices via an ESRU, may be present in an installation. FIG. 4 shows a block diagram of an example environment in which multiple energy storage regulators are present. In FIG. 4, several energy storage regulators (e.g., 400) and associated energy storage regulation units and devices communicate with a supervisory monitoring and control center 410.

In some cases, an energy storage regulator 400 may send telemetry data about the ESRUs it regulates to the supervisory monitoring and control center 410, which is responsible for coordinating the activities of several regulators 400. The supervisory monitoring and control center 410 may issue directing instructions to one or more of the regulators 400, which may in turn use the directing instructions to determine and issue control instructions to the energy storage regulation units under its control. Communications between the regulators 400 and the control center 410 may occur over standard communications interfaces, e.g., wireless networking.

Energy storage regulators and their associated ESRUs may be further grouped into arrays; these arrays may be grouped, for example, by storage type, electrochemistry, etc.

In one example implementation of a multi-regulator environment, analog measurement signals are received by an embedded regulator controller closest to an energy storage regulation unit. In such a configuration, several embedded regulator controllers may be connected in a parallel or series configuration. A zonal controller responsible for a zone containing several embedded regulator controllers may be present. In order to provide a reliable communication network for each embedded controller to exchange information and commands with ESRUs and with the zonal controller, a communications protocol such as the CAN bus protocol may be utilized. A controller area network (CAN bus) is a bus standard designed to allow microcontrollers and devices to communicate with each other in applications without a host computer. It is a message-based protocol, designed originally for automotive applications, but is also used in many other contexts.

Various use scenarios can illustrate procedures for practicing certain disclosed techniques and/or implementing disclosed systems. The use scenarios may also illustrate advantages, including technical effects, of the disclosed techniques and systems. These use scenarios should not be construed as limiting.

One use scenario involves an industrial facility such as a plant or factory. Industrial facilities have many demand loads with repeated peaks and rises. This type of load is sometimes referred to as a "pulsed load." Examples of pulsed loads include a heater with a periodic heating cycle, a large crane, and a belt carrying heavy materials. Another example of a pulsed load scenario is an electric vehicle parking lot; in the event a large number of electric vehicles request a fast charge during a short time period (for example, during lunch hour at a busy mall), the electric utility service may not be able to keep up. Information technology data centers are also power-hungry during heavy load periods (e.g., a movie streaming service during 8-10 p.m.). In any of these cases, in order to prevent fluctuations in the energy system from propagating to devices that need a constant energy supply, energy storage devices (e.g., batteries) may be installed to even out supply.

However, with some types of storage devices, such as batteries of certain electro-chemistries, deeper discharge levels are known to negatively impact the lifespan of the battery. In some embodiments, systems and techniques may be employed in pulsed load environments to charge the energy storage devices while the pulsed load is off and then return the storage device to normal mode for supplying the load during the times when the pulsed load is on.

Determining the operating modality of an ESRU may in some cases include analyzing the current pulsed load state of the energy system to determine whether it is currently experiencing a pulsed load ("active") or not ("inactive"). The ability to provide "rolling charging" of the storage device based on the pulsed load state is advantageous in that the depth of battery discharge per discharge cycle is reduced, potentially extending the battery lifespan.

Figure 5:
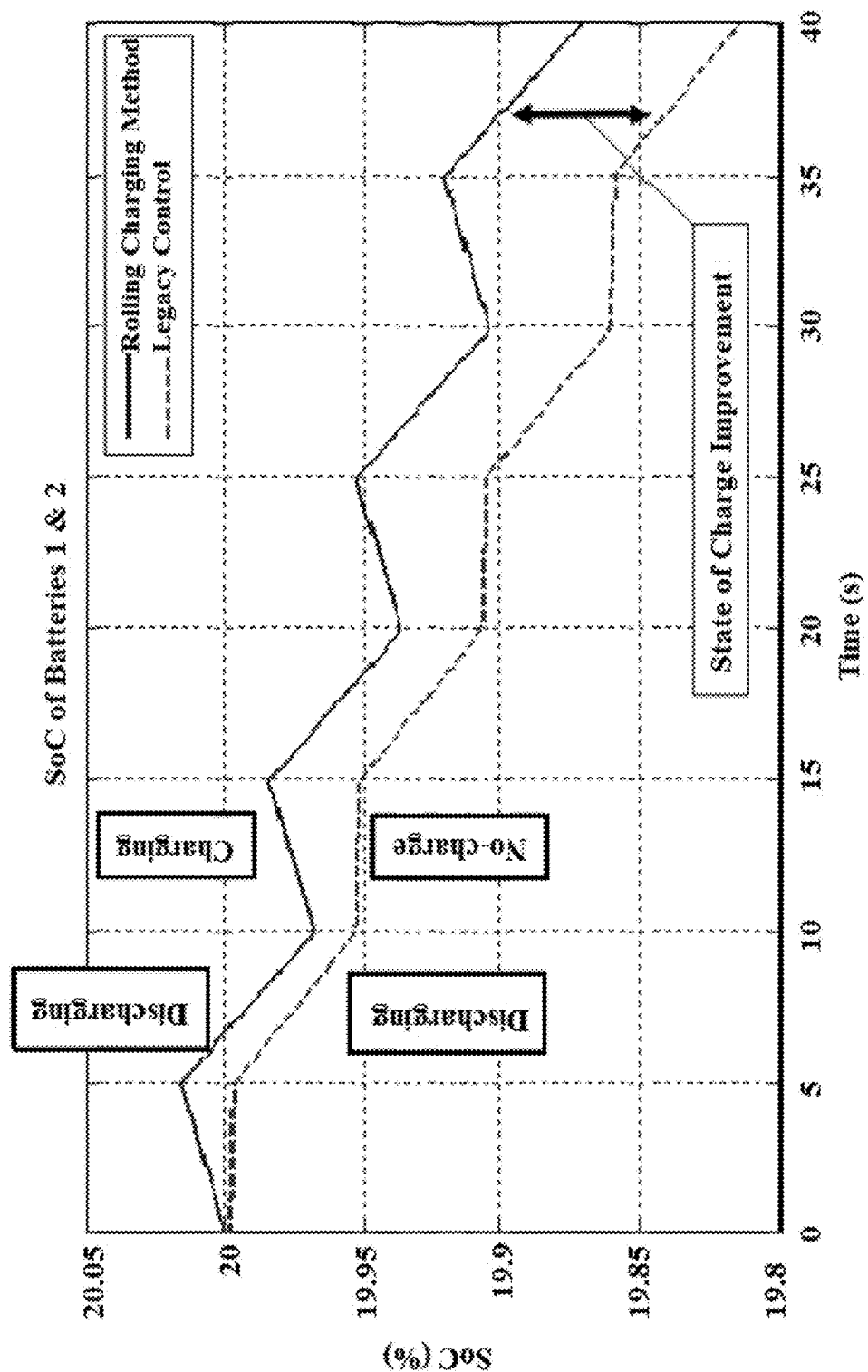
FIG. 5 shows a graph of the state of charge of two different batteries, one of which is charged with consideration of the pulsed load state, and the other which is charged without consideration of the pulsed load state.

FIG. 5 shows a graph of the state of charge of two different batteries, one of which is charged with consideration of the pulsed load state, and the other which is charged without consideration of the pulsed load state. The solid line shows a battery that is charged during pulsed load inactive states. As the graph indicates, the rolling charging technique results in an improved state of charge when compared to a traditional/legacy charging control; the amount of the improvement gradually increases over a period of time.

Another use scenario involves electric vehicles. Many electric vehicles operate today on a series array of lithium ion batteries. Disclosed systems and techniques may be employed in an electric vehicle battery array to bypass a failed battery or set of batteries without interrupting the power flow across the system load bus. An electric vehicle may proceed safely to its destination until the failed batter(ies) can be replaced.

In another use scenario, disclosed systems and techniques improve the functioning and availability of "second life" batteries. For example, the lithium ion batteries in electric vehicles are typically replaced when their usable capacities have degraded below 80% of their original capacity. While these batteries are no longer adequate for electric vehicle usage, they may still have significant capacity that can be used in alternative areas, such as industrial and utility facilities. However, a challenge of the widespread use of second life batteries is the lack of appropriate energy storage regulation capability for handling the wider range of voltage and state of health levels. The disclosed ESRU provides the ability for individualized control of these second life batteries.

In any of the above scenarios, the disclosed systems and techniques can improve the charging characteristics of the energy storage devices, which may enable the use of a smaller-sized energy storage bank that can reduce initial startup costs.

Figure 6:
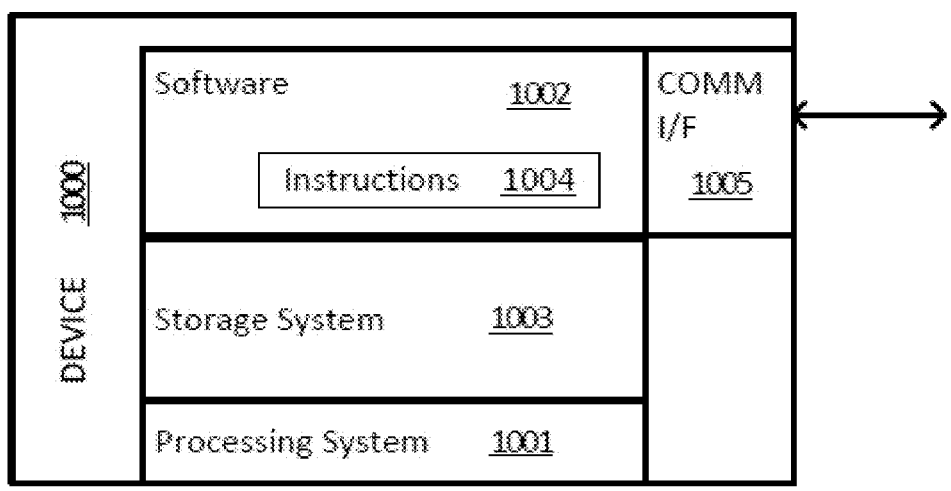
FIG. 6 shows a block diagram illustrating components of a computing device or system used in some implementations.

FIG. 6 shows a block diagram illustrating components of a computing device or system used in some implementations or embodiments incorporating techniques and systems for an energy storage regulator as described herein. For example, a component of the system, such as the regulator controller, may be implemented as described with respect to device 1000, which can itself include one or more computing devices. The hardware can be configured according to any suitable computer architectures such as a Symmetric Multi-Processing (SMP) architecture or a Non-Uniform Memory Access (NUMA) architecture.

The device 1000 can include a processing system 1001, which may include a processing device such as a central processing unit (CPU) or microprocessor and other circuitry that retrieves and executes software 1002 from storage system 1003. Processing system 1001 may be implemented within a single processing device but may also be distributed across multiple processing devices or sub-systems that cooperate in executing program instructions.

Examples of processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 1003 may comprise any computer readable storage media readable by processing system 1001 and capable of storing software 1002 including, e.g., processing instructions for a regulator controller of an energy storage regulator. Storage system 1003 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical media, flash memory, solid state memory, phase change memory, 3D Xpoint memory, or any other suitable storage media. Certain implementations may involve either or both virtual memory and non-virtual memory. In no case do storage media consist of a propagated signal. In addition to storage media, in some implementations, storage system 1003 may also include communication media over which software 1002 may be communicated internally or externally.

Storage system 1003 may be implemented as a single storage device but may also be implemented across multiple storage devices or sub-systems co-located or distributed relative to each other. Storage system 1003 may include additional elements capable of communicating with processing system 1001.

Software 1002 may be implemented in program instructions and, among other functions, may, when executed by device 1000 in general or processing system 1001 in particular, direct device 1000 or processing system 1001 to operate as described herein for performing the activities of a regulator controller of an energy storage regulator. Software 1002 may provide program instructions 1004 that implement components for regulating energy storage as described herein. Software 1002 may implement on device 1000 components, programs, agents, or layers that implement in machine-readable processing instructions 1004 the methods and techniques described herein.

In general, software 1002 may, when loaded into processing system 1001 and executed, transform device 1000 overall from a general-purpose computing system into a special-purpose computing system customized to perform the activities of a regulator controller of an energy storage regulator in accordance with the techniques herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage. Software 1002 may also include firmware or some other form of machine-readable processing instructions executable by processing system 1001. Software 1002 may also include additional processes, programs, or components, such as operating system software and other application software.

Device 1000 may represent any computing system on which software 1002 may be staged and from where software 1002 may be distributed, transported, downloaded, or otherwise provided to yet another computing system for deployment and execution, or yet additional distribution.

A communication interface 1005 may be included, providing communication connections and devices that allow for communication between device 1000 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 1000 may be included in a system-on-a-chip (SoC) device. These elements may include, but are not limited to, the processing system 1001, a communications interface 1005, and even elements of the storage system 1003 and software 1002.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An energy storage regulator for an energy system, the regulator comprising:
   one or more energy storage regulation units, each energy storage regulation unit comprising:
   a positive load bus switch for selectively connecting a positive terminal of an energy storage device to an energy system load bus;
   a negative load bus switch for selectively connecting a negative terminal of the energy storage device to the energy system load bus;
   a pair of charging switches for selectively connecting the energy storage device to an energy system charging bus; and
   a bypass switch for selectively maintaining continuity across the energy system load bus when both the positive load bus switch and the negative load bus switch are disconnected; and
   a regulator controller connected to the one or more energy storage regulation units and being operable to, in response to receiving measurement data from one or more measurement devices pertaining to at least one of the one or more energy storage regulation units;
   determine an operating modality for a particular one or more energy storage regulation units; and
   send a control instruction in accordance with the operating modality to the particular one or more energy storage regulation units,
   the control instruction for a normal modality directing the positive load bus switch to close, the negative load bus switch to close, the bypass switch to open, and the pair of charging switches to open,
   the control instruction for a charging modality directing the pair of charging switches to close, the positive load bus switch to open, the negative load bus switch to open, and the bypass switch to close,
   the control instruction for a bypass modality directing the bypass switch to close, the positive load bus switch to open, the negative load bus switch to open, and the pair of charging switches to open,
   the positive load bus switch being electrically directly connected to the positive terminal of the energy storage device, and
   the negative load bus switch being electrically directly connected to the negative terminal of the energy storage device.

2. The energy storage regulator of claim 1, wherein the one or more measurement devices include a device connected to measure voltage across the energy system load bus of a particular energy storage regulation unit.

3. The energy storage regulator of claim 1, wherein the one or more measurement devices include a device connected to measure amperage drawn from a particular energy storage device of a particular energy storage regulation unit.

4. The energy storage regulator of claim 1, wherein the one or more measurement devices include a device to measure a temperature of a particular energy storage regulation unit.

5. The energy storage regulator of claim 1, wherein the regulator controller is further operable to send the measurement data to a supervisory monitoring and control center, receive a directing instruction from the supervisory monitoring and control center, and wherein determining the operating modality comprises interpreting the directing instruction.

6. The energy storage regulator of claim 1, wherein determining the operating modality comprises analyzing a pulsed load state of the energy system and determining the normal modality when the pulsed load state is active and the charging modality when the pulsed load state is inactive.

7. The energy storage regulator of claim 1, wherein the regulator controller comprises a processing system, one or more computer readable media, and program instructions stored on the one or more computer readable media executable by the processing system.

8. The energy storage regulator of claim 1, wherein the regulator controller comprises a microcontroller.

9. The energy storage regulator of claim 1, wherein each energy storage regulation unit further comprises an interlock mechanism that prevents the simultaneous closing of all of the positive load bus switch, the negative load bus switch, the pair of charging switches, and the bypass switch.

10. The energy storage regulator of claim 1, wherein one or more of the positive load bus switch, the negative load bus switch, the pair of charging switches, and the bypass switch of the one or more energy storage regulation units is a relay.

11. The energy storage regulator of claim 1, wherein one or more of the positive load bus switch, the negative load bus switch, the pair of charging switches, and the bypass switch of the one or more energy storage regulation units is a metal-oxide-semiconductor field-effect transistor (MOSFET).

12. The energy storage regulator of claim 1, wherein the energy storage device of the one or more energy storage regulation units comprises a battery.

13. The energy storage regulator of claim 1, wherein the energy storage device of the one or more energy storage regulation units is selected from the group consisting of a super-capacitor and an ultra-capacitor.

14. An energy storage regulation unit for an energy system, comprising:
   a positive load bus switch for selectively connecting a positive terminal of an energy storage device to an energy system load bus;
   a negative load bus switch for selectively connecting a negative terminal of the energy storage device to the energy system load bus;
   a pair of charging switches for selectively connecting the energy storage device to an energy system charging bus; and
   a bypass switch for selectively maintaining continuity across the energy system load bus when both the positive load bus switch and the negative load bus switch are disconnected;
   a normal modality being enabled when the first load bus is connected, the second load bus switch is connected, the bypass switch is disconnected, and the pair of charging switches are disconnected,
   a charging modality being enabled when the pair of charging switches are connected, the first load bus is disconnected, the second load bus switch is disconnected, and the bypass switch is connected,
   a bypass modality being enabled when the bypass switch is connected, the first load bus is disconnected, the second load bus switch is disconnected, and the pair of charging switches are disconnected,
   the positive load bus switch being electrically directly connected to the the energy storage device, and
   the negative load bus switch being electrically directly connected to the negative terminal of the energy storage device.

15. The energy storage regulation unit of claim 14, wherein one or more of the positive load bus switch, the negative load bus switch, the pair of charging switches, and the bypass switch is a relay.

16. The energy storage regulation unit of claim 14, wherein one or more of the positive load bus switch, the negative load bus switch, the pair of charging switches, and the bypass switch is a metal-oxide-semiconductor field-effect transistor (MOSFET).

17. The energy storage regulation unit of claim 14, wherein the energy storage device comprises a battery.

18. The energy storage regulation unit of claim 14, wherein the energy storage device is selected from the group consisting of a super-capacitor and an ultra-capacitor.

19. The energy storage regulation unit of claim 14, further comprising an interlock mechanism that prevents the simultaneous closing of all of the positive load bus switch, the negative load bus switch, the pair of charging switches, and the bypass switch.

* * * * *